Figure 1:
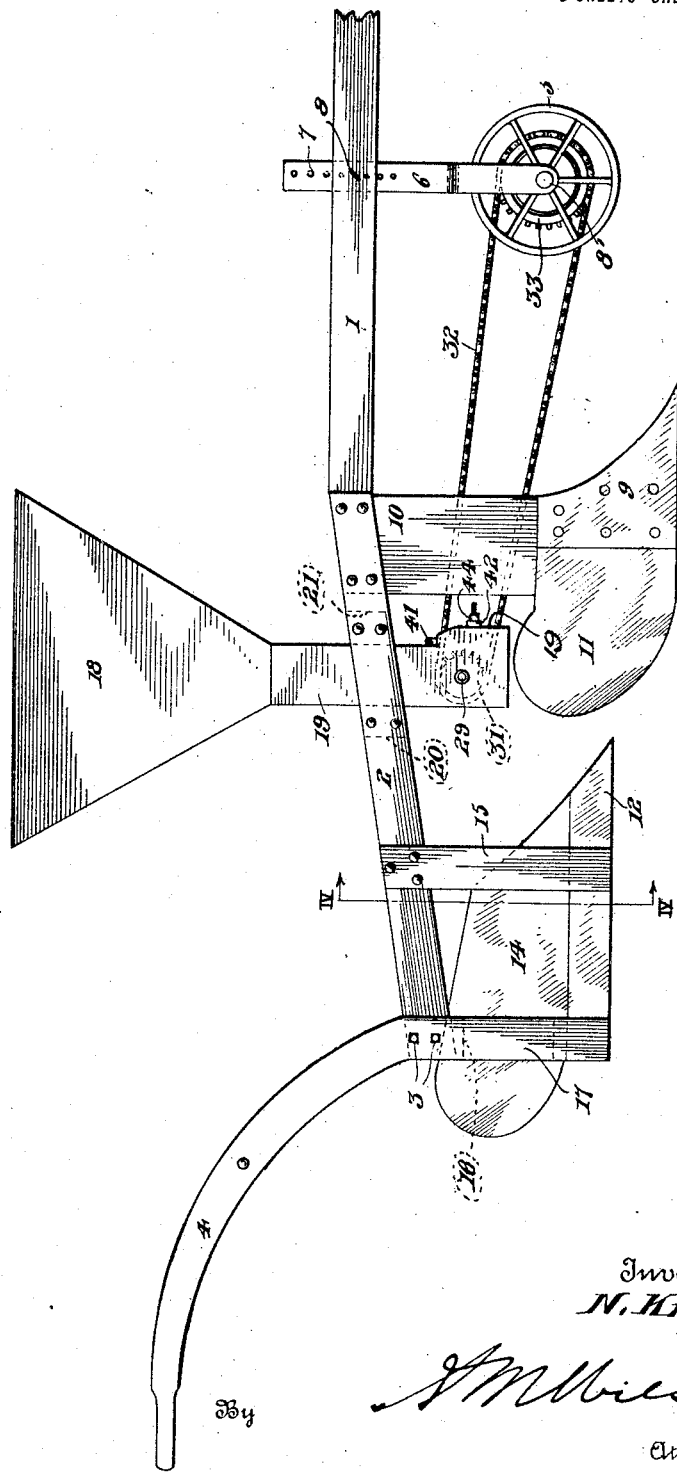

N. KRUPA.
POTATO PLANTER.
APPLICATION FILED OCT. 14, 1919.

1,365,507.

Patented Jan. 11, 1921.
3 SHEETS—SHEET 2.

Inventor
N. Krupa

By
Attorney

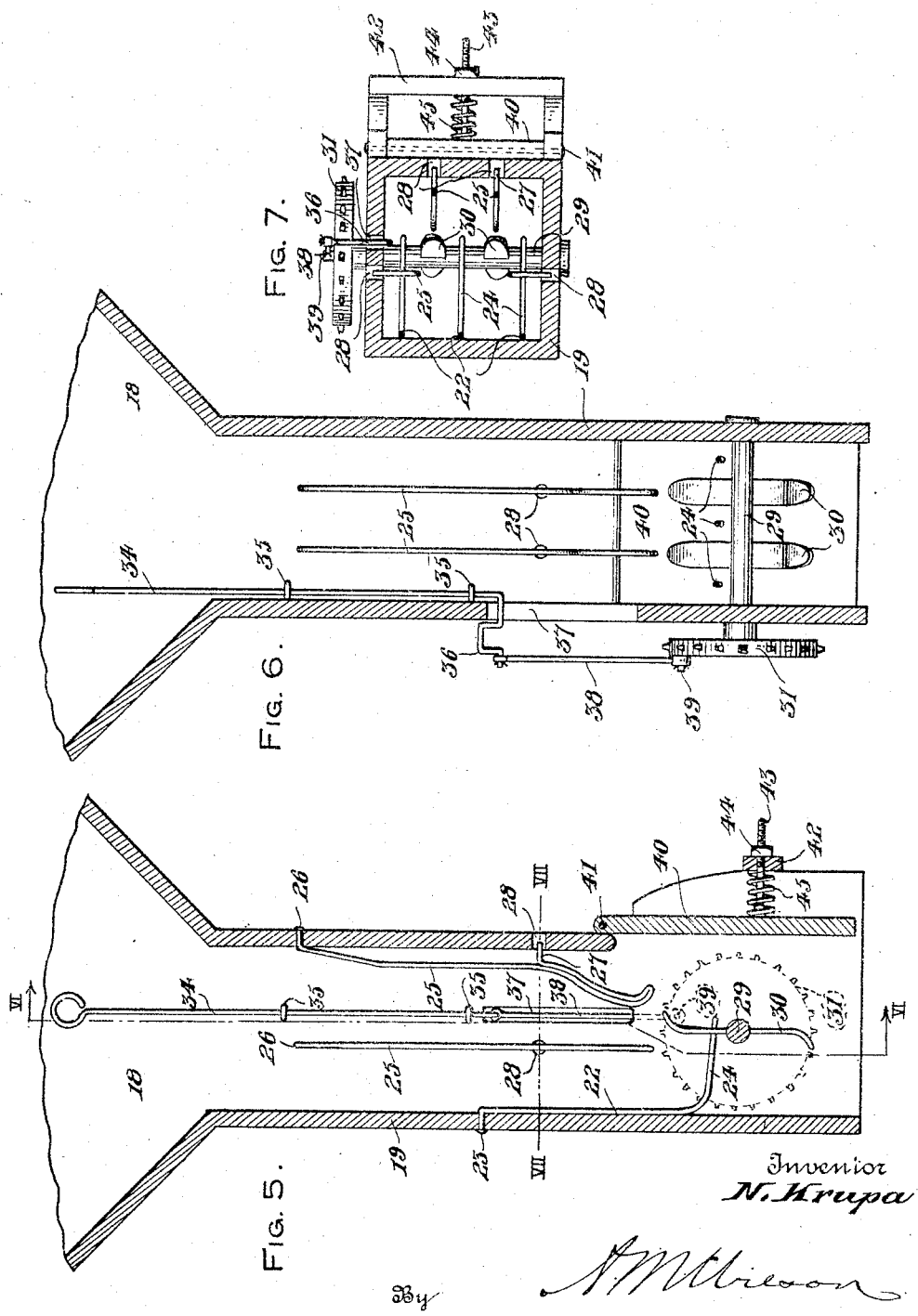

UNITED STATES PATENT OFFICE.

NIKOLAS KRUPA, OF READING, PENNSYLVANIA.

POTATO-PLANTER.

1,365,507.　　　　Specification of Letters Patent.　　Patented Jan. 11, 1921.

Application filed October 14, 1919. Serial No. 330,566.

*To all whom it may concern:*

Be it known that I, NIKOLAS KRUPA, a citizen of Ukraine, residing at Reading, in the county of Berks and State of Pennsylvania, have invented certain new and useful Improvements in Potato-Planters, of which the following is a specification.

The primary object of the present invention resides in the provision of a planting device especially designed for planting potatoes wherein there is employed a plow constructed for digging a furrow to receive the potatoes with an additional plow device arranged rearwardly of the planting means for covering the dropped potatoes.

A further object of the invention is to provide a potato planter in the form of an earth digging and seed dropping device with mechanically operated devices within the seed hopper being operated from power derived from the forward ground engaging wheel.

A still further object of the invention is to provide a potato planter embodying digging means, planting means and a covering means, the planting means including a novel form of hopper having agitating and spring supporting fingers therein with a regulable exhaust passage for the potatoes.

With the above and other objects in view, this invention consists in the novel form, combination and arrangement of parts herein fully described and shown in the accompanying drawings, wherein like reference characters indicate similar parts throughout the several views.

Figures 2, 3, 4:
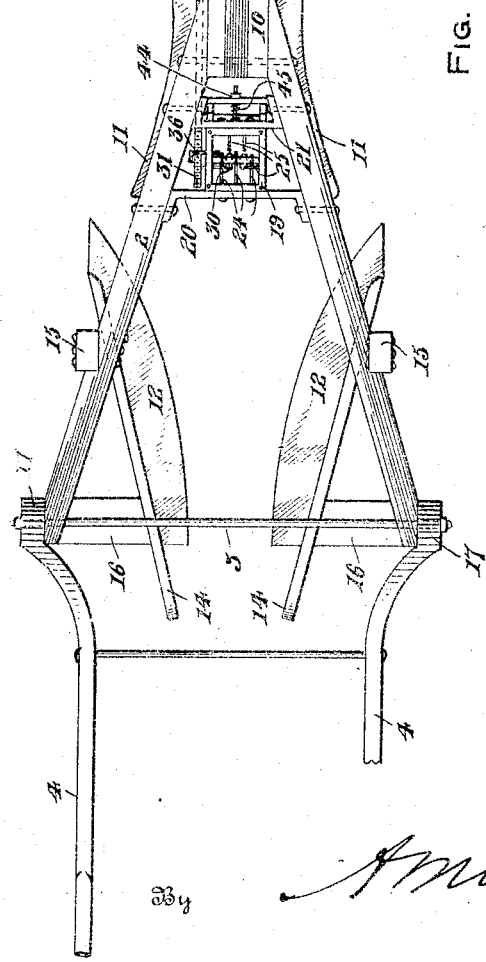

In the drawings,

Figure 1 is a side elevational view of a potato planter constructed in accordance with the present invention, Fig. 2 is a top plan view thereof, partially broken away, Fig. 3 is a detail view, partly in section, of the forward ground engaging wheel, Fig. 4 is a cross sectional view taken on line IV—IV of Fig. 1 showing the forward digging plow, the planting hopper and the rear covering plows, Fig. 5 is a vertical sectional view through the hopper, Fig. 6 is a view taken on line VI—VI of Fig. 5, both views showing the fingers within the hopper and the adjustably tensioned gate passage for the potatoes and Fig. 7 is a horizontal sectional view taken on line VII—VII of Fig. 5 showing the supporting and feeding fingers within the hopper.

Referring more in detail to the accompanying drawings, there is illustrated a planting device embodying a forward horizontal plow beam 1 supporting a triangular-shaped frame 2 at the rear end thereof with the rear ends of said frame connected by a cross brace 3 upon which the handles 4 are mounted. The beam 1 is supported at its forward end upon the ground wheel 5, the same being journaled in the lower forked end of a bracket arm 6 upon a bearing 8', the upper end of the bracket arm 6 being provided with a plurality of openings 7 and slidable through a slot provided in the beam 1 as indicated in Figs. 1 and 3 and retained in vertically adjusting positions by a retaining pin 8 passing through alined openings in the beam 1 and selected opening 7 in the bracket 6, thus to vary the height of the plow beam 1 from the ground.

At the apex of the triangular-shaped frame 2, the forward plow 9 is positioned, the same being carried upon the block 10 and being provided with opposite mold boards 11 as shown in Figs. 2 and 4. Covering plows are carried by the triangular frame 2 rearwardly of the plow 9, and at opposite sides thereof, the plows including base portions 12 having inner beveled edges 13 curved and inclined outwardly from the cross brace 3 toward the apex of the frame 2 and each plow base 12 carrying an upstanding board 14 to insure the central delivery of the earth gathered by the beveled edges 13 of the plows. The plows 12 are supported adjacent their forward ends upon the lower ends of the downwardly extending arms 15 connected to the sides of the frame 2 intermediate the ends thereof, while the rear ends of the plows 12 are further supported upon the inwardly and horizontally directed arms 16 carried by the lower extensions 17 of the handles 4.

The planting means includes a hopper 18 having a chute 19 and its lower end supported between the side bars of the frame 2 adjacent the forward ends thereof by the mounting brackets 20 and 21. The chute 19 of the hopper 18 is preferably rectangular in cross section as indicated in Fig. 7 being entirely open at its lower end as shown in Figs. 5 and 6. In order to temporarily support the cut potatoes in the bottom of the chute, there is provided a plurality of resilient arms 22 lying flush with the rear wall of the chute 19 and being connected at their upper ends as at 23 to said chute while the lower ends are bent outwardly substantially at right angles as shown at 24 to provide a support for the potatoes. A plurality of resilient arms 25 are connected at their upper ends as at 26 to the front and side walls of the chute 19 with the lower ends thereof bent upon themselves and curved inwardly toward the central axis of the chute 19 with the terminal bent ends 27 extending into openings 28 provided in the adjacent walls of the chute, the lower ends of the arms 25 directing the potatoes dropping from the hopper 18 through the chute onto the fingers 24.

A feeding device for the potatoes fed from the hopper 18 onto the fingers 24 in the chute 19 includes a shaft 29 journaled transversely of the chute 19 in the side walls thereof adjacent the lower end and carrying radial blades 30 extending between the fingers 24 so that when the same are revolved potatoes resting upon the fingers will be fed forwardly therefrom into the space at the lower end of the chute forwardly of the fingers and obstructed as illustrated in Fig. 5. The mechanism for rotating the shaft 29 and blades 30 includes a sprocket wheel 31 fixed to the shaft 29 exteriorly of the casing and having a sprocket chain 32 passing therefrom and over the sprocket wheel 33 secured to the bearing 8' of the forward ground wheel 5, the shaft 29 being rotated upon a rolling contact of the forward wheel 5 with the ground. An agitator for the potatoes contained within the hopper 18 is operated by the sprocket wheel 31, the same including a vertically moving arm 34 guided in eyes 35 secured upon the inner wall of the chute 19 with an angularly bent lower end 36 extending outwardly of the chute 19 through the slot 37 for connection with the pitman 38 eccentrically connected as at 39 to the sprocket wheel 31 so that upon rotation of the shaft 29 and sprocket wheel 31 vertical reciprocating movement is imparted to the agitator arm 34.

In order to prevent scattering of the potatoes fed from the chute 19, there is provided a tensioned gate 40 formed as a tension of the front wall of the chute 19 and being substantially coextensive with the rear wall thereof, the tensioned gate 40 being mounted at its upper end upon a horizontal pin 41 and swinging between forward extensions 19' carried by the lower ends of the side walls of the chute. A cross bar 42 extends between the forward extensions 19 of the chute and has a threaded bolt 43 slidably extending therethrough, the bolts having a swivel connection with the outer face of the tension gate 40 and having a nut 44 threaded thereon outwardly of the bearing 42 with a coil spring 45 between the bar 42 and gate 40 whereby the gate is normally held in the position shown in Fig. 5 against the tension of the spring.

From the above detailed description of the device, it is believed that the construction and operation will at once be apparent, it being noted that during the forward travel of the device accompanied by draft applied to the plow beam 1, the forward support 9 will dig a furrow for the planting of potatoes from the hopper 18 while the rear plows 12 will completely cover the dropped potatoes. During the forward movement of the device, the ground wheel 5 communicates rotary motion to the potato feeding blades 30, the shaft of which communicates vibratory motion to the agitator 34 for purposes of directing the potatoes in the hopper 18 into the chute 19. The potatoes delivered into the chute 19 are directed by the resilient arms 25 to fall upon the fingers 24 of the arms 23 and to be gathered therefrom by the rotating blades 30 passing between the fingers 24 in rotary directions. In order to prevent an unnecessary scattering of the potatoes delivered from the chute and as a retarding means therefor, the resilient gate 40 accomplishes this function and the tension thereon is regulable by the adjusting nut 44.

While there is herein shown and described what is believed to be the preferable embodiment of the invention, it is nevertheless to be understood that minor changes may be made therein without departing from the spirit and scope of the invention as claimed.

What is claimed as new is:—

1. Feed dispensing mechanism for potato planters comprising a frame, a hopper on the frame, resilient fingers within the hopper constituting a temporary support for the contents, resilient arms in the hopper directing the contents onto the fingers, rotary blades coöperating with the fingers to feed the contents of the hopper through the lower end thereof and means for operating the rotary blades.

2. Feed dispensing mechanism for potato planters comprising a frame, a hopper on the frame, resilient fingers within the hopper constituting a temporary support for the contents, resilient arms in the hopper directing the contents onto the fingers, rotary blades coöperating with the fingers to feed the contents of the hopper through the lower end thereof, means for operating the rotary blades, said means including a forward ground engaging wheel and chain connections between the ground engaging wheel and the rotary blades.

3. Feed dispensing mechanism for potato planters comprising a frame, a hopper on the frame, resilient fingers within the hopper constituting a temporary support for the contents, resilient arms in the hopper directing the contents onto the fingers, rotary blades coöperating with the fingers to feed the contents of the hopper through the lower end thereof, means for operating the rotary blades, and an agitator within the hopper operated by said rotary blades.

4. Feed dispensing mechanism for potato planters comprising a frame, a hopper on the frame, spring fingers within the hopper forming a temporary support for potatoes contained therein, resilient arms for directing the potatoes onto the spring fingers, a shaft journaled beneath said fingers, rotary blades carried by said shaft adapted to be projected between the spring fingers for feeding the potatoes therefrom outwardly of the chute.

5. Feed dispensing mechanism for potato planters comprising a frame, a hopper on the frame, spring fingers within the hopper forming a temporary support for potatoes contained therein, resilient arms for directing the potatoes onto the spring fingers, a shaft journaled beneath said fingers, rotary blades carried by said shaft adapted to be projected between the spring fingers for feeding the potatoes therefrom outwardly of the chute, and a resilient gate carried by the chute operating to retard the feed of potatoes by the rotary blades.

6. Feed dispensing mechanism for potato planters comprising a frame, a hopper on the frame, spring fingers within the hopper forming a temporary support for potatoes contained therein, resilient arms for directing the potatoes onto the spring fingers, a shaft journaled beneath said fingers, rotary blades carried by said shaft adapted to be projected between the spring fingers for feeding the potatoes therefrom outwardly of the chute, and an agitator within the chute operated by said shaft.

In testimony whereof I affix my signature.

NIKOLAS KRUPA.